US011544120B2

(12) United States Patent
Joyce et al.

(10) Patent No.: US 11,544,120 B2
(45) Date of Patent: Jan. 3, 2023

(54) TRACKING APPLICATION PROGRAMMING INTERFACE REQUESTS IN A CLOUD COMPUTING SYSTEM

(71) Applicant: EMC IP Holding Company LLC, Hopkinton, MA (US)

(72) Inventors: Scott E. Joyce, Foxboro, MA (US); Yingying Wang Martin, Southborough, MA (US); Dan Yuan, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 503 days.

(21) Appl. No.: 16/779,550

(22) Filed: Jan. 31, 2020

(65) Prior Publication Data

US 2021/0240551 A1 Aug. 5, 2021

(51) Int. Cl.
*G06F 9/44* (2018.01)
*G06F 9/54* (2006.01)
*H04L 67/00* (2022.01)
*G06F 11/36* (2006.01)

(52) U.S. Cl.
CPC .............. *G06F 9/541* (2013.01); *G06F 9/542* (2013.01); *G06F 9/546* (2013.01); *G06F 11/3688* (2013.01); *G06F 11/3692* (2013.01); *H04L 67/34* (2013.01)

(58) Field of Classification Search
CPC ....................................................... G06F 9/541
USPC ......................................................... 719/328
See application file for complete search history.

(56) References Cited

U.S. PATENT DOCUMENTS

2019/0384691 A1* 12/2019 Kumar .................. G06F 11/302
2020/0366697 A1* 11/2020 Vittal ...................... G06F 9/468
2020/0401336 A1* 12/2020 dos Santos Silva .... G06F 3/067

OTHER PUBLICATIONS

Dell EMC, "A Proactive Monitoring and Analytics Application for Dell EMC Storage Systems," CloudIQ Detailed Review, Jan. 2019, 42 pages.
Brian Cooksey, "An Introduction to APIs," Zapier, Inc., Apr. 23, 2014, 77 pages.

* cited by examiner

*Primary Examiner* — Timothy A Mudrick
(74) *Attorney, Agent, or Firm* — Ryan, Mason & Lewis, LLP (57) ABSTRACT

Techniques are provided for tracking application programming interface (API) requests in a cloud computing environment. For example, a method for tracking API requests is implemented by an API gateway. The API gateway receives an API request which comprises a given API endpoint to access a target service of a computing system. The API gateway determines if the received API request is valid. In response to determining that the received API request is valid, the API gateway accesses at least one API counter associated with the given API endpoint of the received API request, wherein the at least one API counter is configured to count a number of times that the given API endpoint is accessed. The API gateway increments a count of the at least one API counter by one, and the API gateway routes the API request to the target service for execution.

20 Claims, 5 Drawing Sheets

TRACKING APPLICATION PROGRAMMING INTERFACE REQUESTS IN A CLOUD COMPUTING SYSTEM

FIELD

This disclosure relates generally to techniques for tracking application programming interface (API) requests in a cloud computing environment for purposes such as system integration testing (SIT).

BACKGROUND

Currently, various entities provide cloud computing services for critical and non-critical applications globally to millions of users and customers who reside in different geolocations (e.g., countries, continents, etc.). The cloud computing services include, for example, Software-as-a-Service (SaaS), Infrastructure-as-a-Service (IaaS), and/or Platform-as-a-Service (PaaS). A cloud computing system implements an API to enable various applications and computing platforms to communicate with and access the cloud computing system, or otherwise allow other applications and computing platforms to integrate within the cloud computing system. For example, cloud computing systems can implement Representational State Transfer (REST) APIs or APIS that are based on SOAP (Simple Object Access Protocol).

With various types of cloud computing services such as SaaS, an agile software development methodology is implemented to support continuous development and delivery of new and updated services (e.g., incremental builds) in relatively short cycles (e.g., every few weeks). With agile development, before new or updated code for features is pushed to the production pipeline, development teams (referred to as "scrum" teams) responsible for such features will typically perform automation testing (e.g. regression testing) to ensure that a given feature is working properly as expected and to ensure that the new or updated/fixed feature does not adversely impact other system features or otherwise result in some regression in the cloud computing system. Such automation testing is typically performed using an automated system integration testing (SIT) tool that executes test cases to test and verify the specific functionalities of the system features and/or the communication among system features.

When performing SIT automation testing, it is important to ensure that that the requisite tests have been created and implemented correctly. Furthermore, when performing SIT automation testing, it is advantageous to acquire test results which clearly indicate what APIs were accessed as a result of a given SIT run, and which clearly demonstrate the impact to the system under test (SUT) as a result of the various APIs that were accessed during the given SIT run.

SUMMARY

Exemplary embodiments of the disclosure include methods for tracking API requests in a cloud computing environment. For example, in one embodiment, a method for tracking API requests is implemented by an API gateway. The API gateway receives an API request which comprises a given API endpoint to access a target service of a computing system. The API gateway determines if the received API request is valid. In response to determining that the received API request is valid, the API gateway accesses at least one API counter associated with the given API endpoint of the received API request, wherein the at least one API counter is configured to count a number of times that the given API endpoint is accessed. The API gateway increments a count of the at least one API counter by one, and the API gateway routes the API request to the target service for execution.

Other embodiments of the disclosure include, without limitation, computing systems and articles of manufacture comprising processor-readable storage media for tracking API requests in a cloud computing environment.

DETAILED DESCRIPTION

Exemplary embodiments of the disclosure will now be described in further detail with regard to systems and methods for tracking API requests in a cloud computing system that implements, e.g., a distributed API architecture. In some embodiments, API requests are tracked using counters that are configured to count a number of times that APIs and variations of the APIs (e.g., different parameters, methods, etc., of a given API) are accessed, wherein the API count information can be utilized for various purposes such as SIT automation testing, monitoring end-user or customer usage of services, etc.

Figure 1:
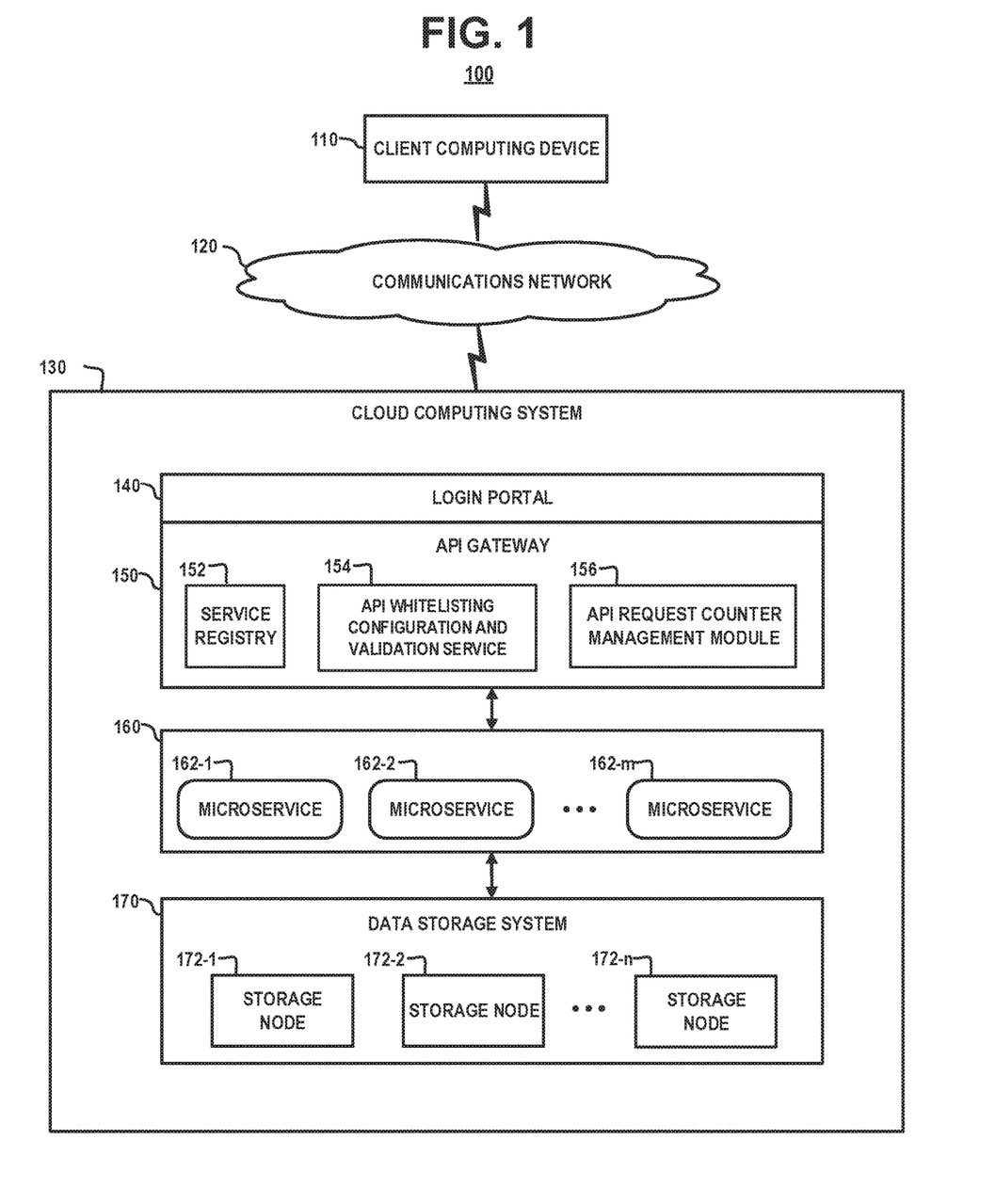
FIG. 1 is a high-level schematic illustration of a cloud computing system having a distributed API architecture which is configured to track API requests in the cloud computing system, according to an exemplary embodiment of the disclosure.

FIG. 1 is a high-level schematic illustration of a cloud computing system having a distributed API architecture which is configured to track API requests in the cloud computing system, according to an exemplary embodiment of the disclosure. More specifically, FIG. 1 schematically illustrates a system 100 which comprises a client computing device 110, a communications network 120, and a cloud computing system 130. The cloud computing system 130 comprises a user login portal 140, an API gateway 150, an application platform 160, and a data storage system 170. The API gateway 150 comprises a service registry 152, an API whitelisting configuration and validation service 154, and an API request counter management module 156. As explained in further detail below, in some embodiments, the API whitelisting configuration and validation service 154 and the API request counter management module 156 collectively implement a system for utilizing counters to track API requests in the cloud computing system 130.

The client computing device 110 comprises one of various types of computing systems or devices such as a desktop computer, a laptop computer, a workstation, a computer server, an enterprise server, a rack server, a smart phone, an electronic tablet, etc., which can access the cloud computing system 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols.

The cloud computing system 130 is configured to perform data processing, data storage, and data management functions to support one or more cloud-based or web-based applications or services and/or other types of applications that are implemented by the application platform 160. The data storage system 170 comprises a plurality of data storage nodes 172-1, 172-2, . . . , 172-n (collectively, data storage nodes 172). The data storage system 170 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 172 comprise storage appliances with memory controllers, processors, cache memory, and non-volatile storage media to provide persistent storage resources (e.g., file repositories, databases, etc.) for the application platform 160 and other computing nodes of the cloud computing system 130.

The data storage devices of the data storage nodes 172 may include one or more different types of persistent storage devices, or data storage arrays, such as hard disk drives or solid-state drives, or other types and combinations of non-volatile memory. In one embodiment, the data storage nodes 172 are implemented using, for example, an enterprise-class storage platform comprising high-performance, scalable storage arrays, which can be implemented for hyper-scale computing systems. For example, the data storage system 170 can be implemented using commercially available storage array systems and applications.

In the exemplary embodiment of FIG. 1, the application platform 160 comprises a microservices-based architecture which includes plurality of microservices 162-1, 162-2, . . . , 162-m (collectively, microservices 162) that are combined to provide a structured application. As is known in the art, a microservices-based framework implements an application as a collection of loosely-coupled services, wherein the services expose fine-grained APIs and lightweight protocols. Each microservice 162-1, 162-2, . . . , 162-m comprises a self-contained software module with associated functionality and interfaces. In some embodiments, the microservice-based application platform 160 runs in a virtualized environment (e.g., virtual machines) or a containerized environment (e.g., containers) in which the number of instances of a given microservice and the locations (e.g., host and port) of such instances change dynamically.

In the microservices architecture, each microservice 162 (and instances thereof) exposes a set of fine-grained endpoints to access resources provided by the microservice. Each endpoint specifies a location from which APIs can access the resources needed to perform functions. Each microservice 162 maintains its own database in the data storage system 170 in order to be decoupled from other microservices. Data consistency between the distributed microservices 162 is implemented using known techniques such as the Saga pattern. The microservice-based framework enables the individual microservices 162 to be deployed and scaled independently, to be developed and updated in parallel by different teams and in different programming languages, and to have their own continuous delivery and deployment stream. While the application platform 160 is generically depicted in FIG. 1, the application platform 160 can implement any suitable cloud-based application (e.g., multi-tenant SaaS application). For example, the application platform 160 can implement a cloud-based SaaS application that allows customers to monitor, analyze, and troubleshoot their storage systems, or any other type of SaaS application which comprises hundreds or thousands of microservices and associated endpoints.

The login portal 140 and the API gateway 150 allow client applications running on client devices (e.g., client computing device 110) to access the individual microservices 162 of the application platform 160. More specifically, the login portal 140 comprises a user interface which implements methods that allow a user to connect to the cloud computing system 130 (via the client computing device 110) and login to the cloud computing system 130 and provide credentials for a user authentication/verification process. In some embodiments, the login portal comprises different user interfaces to support connectivity with different type of devices, e.g., mobile devices, desktop computers, servers, etc., and different types of HTML-based browsers.

The API gateway 150 implements methods that are configured to enable client applications to access the services of the microservices-based application platform 160. In particular, the API gateway 150 provides a single entry point for client applications to issue API requests for services that that are provided by the application platform 160. The API gateway 150 abstracts the client applications from knowing how the application platform 160 is partitioned into microservices, and from having to determine the locations of service instances. The API gateway 150 comprises logic for calling one or more of the microservices 162 in response to a client request. The API gateway 150 communicates with client applications and the microservices 162 using any suitable API framework. For example, in some embodiments, the API gateway 150 and the microservices 162 implement a REST API. In other embodiments, the API gateway 150 and the microservices 162 implement a SOAP API.

In some embodiments, the API gateway 150 is implemented using a single gateway service that is configured to interface with many different types of client applications (e.g., web-based applications, mobile applications, etc.). In other embodiments, the API gateway 150 comprises a plurality of gateway services, each configured to interface with a different type of client application. In all instances, the API gateway 150 performs various functions. For example, the API gateway 150 functions as a reverse proxy to redirect or route requests from client applications to target endpoints of the microservices 162. In this instance, the API gateway 150 provides a single endpoint or Uniform Resource Locator (URL) to receive requests from client applications for access to services of the application platform 160, and internally maps client requests to one or more of the microservices 162.

Furthermore, the API gateway 150 implements aggregation services to aggregate multiple client requests (e.g., HTTP requests) which target multiple microservices 162 into a single request. In this instance, a client application may send a single request to the API gateway 150 to perform a single task, and the API gateway 150 dispatches multiple calls to different backend microservices 162 to execute the task. The API gateway 150 aggregates the results from the multiple microservices and sends the aggregated results to the client application. In this instance, the client application issues a single request and receives a single response from the API gateway 150 despite that the single request is parsed and processed by multiple microservices 162. The API gateway 150 can be configured to implement other functions or microservices to implement authentication and authorization, service discovery, response caching, load balancing, etc.

The service registry 152 generates and maintains a database of microservices 162 of the application platform 160, including a list of all instances of the microservices 162 and the locations of all instances of the microservices 162. Each microservice 162 of the application platform 160 will maintain a list of its valid API endpoints (e.g., REST endpoints) including the paths, methods, headers, URL parameters, supported parameter values, etc., of the API endpoints of the microservice 162. During service startup, the instances of the microservices 162 will push their API endpoint information (e.g., via JSON) to the service registry 152. The microservice instances are registered with the service registry 152 on startup and then deregistered on shutdown.

The microservices registration information of the service registry 152 is leveraged in various ways. For example, the API gateway 150 utilizes the microservices registration information to identify available instances of the microservices 162 and their locations to support client request routing and load balancing functions. In addition, the API whitelisting configuration and validation service 154 leverages the microservices registration information to dynamically generate and maintain a detailed centralized whitelist of all valid and permitted API endpoints exposed by the microservices 162 of the application platform 160, and utilize the whitelist of valid and permitted endpoints to implement security measures to control access to the microservices 162 of the application platform 160 and thereby reduce the "attack vectors" of the application platform 160 and the cloud computing platform 130. An attack vector is a path or means by which a hacker can gain access to a computing system or network to, e.g., deliver a malicious payload such as a virus or otherwise exploit system vulnerabilities.

More specifically, the API whitelisting configuration and validation service 154 implements methods for generating and dynamically updating a whitelist of known, valid API requests that are exposed by the microservices 162, which are approved and permitted to be issued to microservices 162 of the application platform 160. It is to be understood that the term "whitelist" as used herein is to be broadly construed to mean any type of listing of known and valid endpoints that exist in given computing system, irrespective of the methods and data structures utilized to generate and maintain such listing of known and valid endpoints. The whitelist represents a consolidated listing of valid and permitted API endpoints that are exposed by the microservices 162 at a given time, and the centralized whitelist of permitted API endpoints is dynamically updated on a continual basis as the individual microservices 162 are started, stopped, and updated over time.

The whitelist of permitted API endpoints is utilized by the API whitelisting configuration and validation service 154 of the API gateway 150 to perform security and access control functions to reduce the system attack vectors. For example, the API whitelisting configuration and validation service 154 is configured to perform whitelisting operations on API requests that are received from, e.g., client applications of end-users or customers/tenants. The API gateway 150 will invoke the API whitelisting configuration and validation service 154 to determine if a received API request is valid before routing the API request to one or more microservices 162. In particular, the API whitelisting configuration and validation service 154 performs a whitelisting validation operation which comprises comparing an API endpoint of a given API request to the whitelist of permitted API endpoints of registered microservices 162 of the application 160 to determine whether the API endpoint of the API request comprises a permitted API endpoint in the whitelist.

The API whitelisting configuration and validation service 154 of the API gateway 150 is configured to validate one or more portions of an API request including, but not limited to, (i) allowed URL paths, (ii) allowed HTTP methods, (iii) allowed URL parameters, (iv) allowed URL parameter values, and (v) allowed HTTP headers, etc. The whitelisting validation operations are configured to allow known and permitted API requests to be forwarded by the API gateway 150 to target microservices 162, while detecting and rejecting invalid, and non-permitted client API requests. Further, in some embodiments, the API whitelisting configuration and validation service 154 is configured to track rejected or failed requests in a centralized location for further analysis to determine if such requests are associated with intentional malicious attacks, etc.

In some embodiments, the API whitelisting configuration and validation service 154 comprises an entitlement validation service that is configured to implement role-based access management operations. When a given microservice registers with the service registry 152, the microservice can provide metadata that specifies what entitlements or credentials a given client will actually need to call the microservice. The entitlement validation is performed to ensure that a given client can actually invoke and utilize a given endpoint of a given microservice irrespective of whether the client request is deemed by the whitelisting validation service 152 to be a valid and permitted request.

In other embodiments, the API request counter and management module 156 leverages the API whitelist and API validation service to track and count API requests that are issued in the cloud computing system 130 during, e.g., SIT automation runs. As noted above, the API whitelist comprises a list of all externally exposed APIs within the cloud computing system 130, as well as the valid parameters and values that are supported by the APIs. The API request counter management module 156 is configured to associate counters to the APIs within the API whitelist and utilize the counters to track the number of times that the APIs within the API whitelist are accessed in response to API requests that are issued, for example, by a SIT tool during SIT automation testing, or by end-users or customers that utilize the services of the cloud computing system 130, etc. In particular, for a given API, the counters associated with the given API are configured to count how many times the given API was accessed in response to issued API requests, and how many times variations of the given API (e.g., different URL paths, parameters, headers, methods etc.) were accessed in response to issued API requests.

Figure 2:
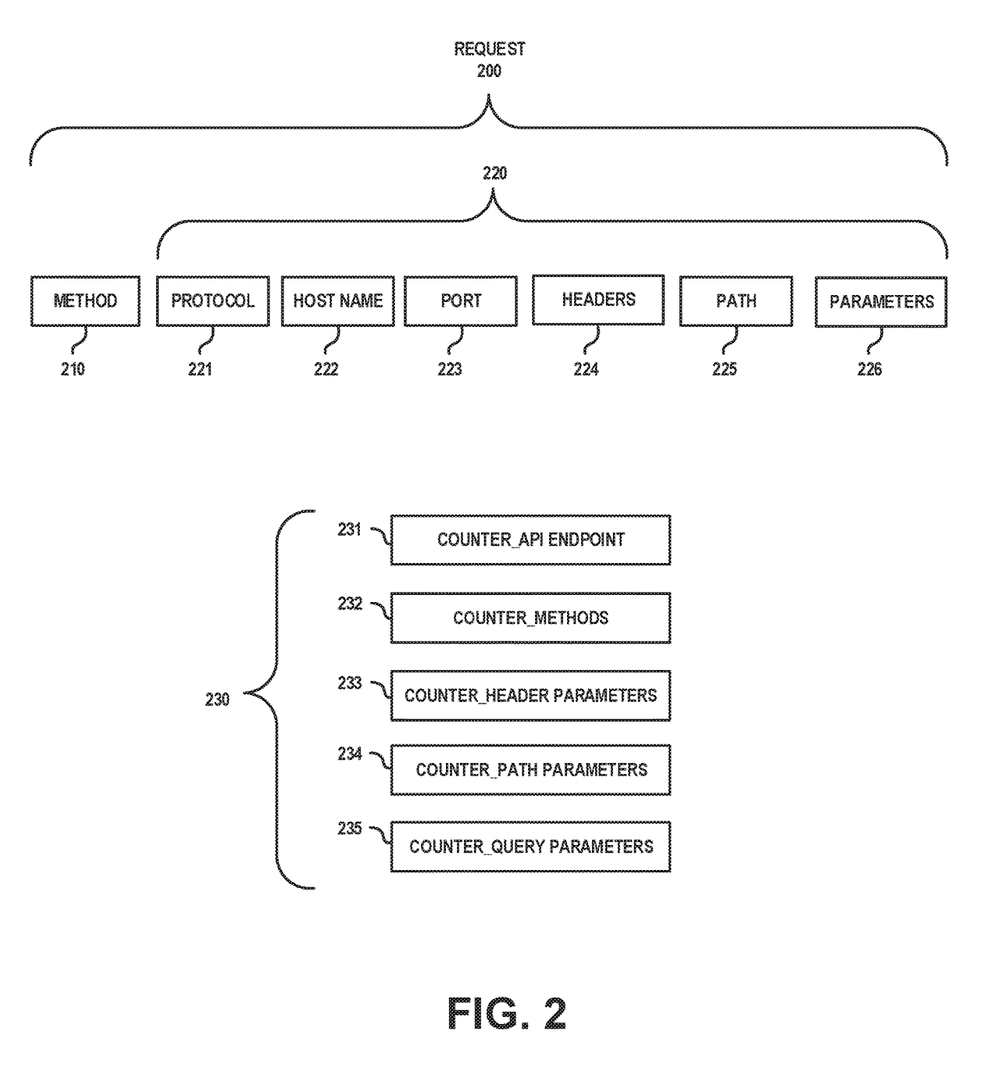
FIG. 2 illustrates an exemplary framework of an API request and a set of counters that can be associated with different components of the API request, according to an exemplary embodiment of the disclosure.

FIG. 2 illustrates an exemplary framework of an API request and a set of counters that can be associated with different components of the API request, according to an exemplary embodiment of the disclosure. In a REST API framework, each resource is assigned to a unique API endpoint (alternatively referred to as an API URL). An API endpoint (or API URL) specifies a path through which a resource can be accessed, wherein the API endpoint comprises a base path and end path. A resource is an object or representation of something, which has some associated data, and there can be set of methods to operate on it. The REST API defines what actions can be performed on the resources and what types of data are required for each action and the format of the data.

As noted above, in some embodiments, each microservice 122 exposes REST API endpoints including the path, method, headers, URL parameters, and supported parameter values. As shown in FIG. 2, the API request 200 comprises a method 210 and a URL string 220. The URL string 220 comprises a protocol 221, a host name 222, a port 223, headers 224, an endpoint path 225, and parameters 226. The URL string 220 specifies a given information resource that can be accessed through the URL string 220.

The URL string 220 is accompanied by a method 210 which specifies what action the client wants to be performed on a given resource. For example, common methods include GET, POST, PUT and DELETE. A GET method is utilized to retrieve a resource from a server (e.g., the server looks for data requested by the client and sends the requested data to the client). The GET method is a default method. A POST method is utilized to create a new resource on a server (e.g., create a new entry in a database). A PUT method is utilized to update a resource on a server (e.g., update an entry in a database). A DELETE method is utilized to delete a resource from a server (e.g., delete an entry in a database).

The endpoint of the API request 220 comprises a root endpoint and the endpoint path 225. The root endpoint comprises the protocol 221 (e.g., HTTP, HTTPS), the host name 222, and the port 223. The root endpoint (221, 222, and 223) comprises the base portion of the URL string 220 which directs the client request to the associated API gateway. The path 225 specifies the endpoint path of the particular resource that is being requested.

The headers 224 provide certain types of information to the server for particular purposes, e.g., supporting authentication operations, providing information about the body content, etc. The headers 224 are typically specified as property-value pairs or key-value pairs using, e.g., JSON. The property or key portion specifies an attribute about an object, and the value specifies the value of the attribute. In some embodiments, an endpoint will require unique parameters to be passed in the header 224, and such parameters will be specifically defined by the API for the given endpoint.

The parameters 226 include path parameters that are included as part of the endpoint itself as well as parameters that specify information or data that the client sends to the server. The parameters 226 can be used in conjunction with the specified method 210. The parameters 226 include, for example, a query string and query parameters which are passed with the endpoint. The query string is the portion of the URL 220 which is used to pass data to the server, and the query parameters comprise one or more key-value pairs that are included in the query string. The parameters 226 can specify a response format or an amount of data returned, etc.

As is known in the art, REST APIs use the query string to define query parameters of a search. The API of a given service will define what parameters are acceptable, and the exact names of those parameters which need to be used to execute the search. In addition, the parameters 226 can include request body parameters (typically specified in JSON). For example, with POST and PUT requests, a JSON object can be included in the API request (e.g., one or more strings of property-value pairs) to send data to the server to create or update a given resource.

As an example, an endpoint can be http://apiserver.com/cars?limit=3&format=json. The exemplary endpoint includes the entire URL path to a given resource. The string http://apiserver.com denotes the base path (or base URL or host) and refers to a common path for the API (e.g., the API gateway). The string /cars refers to the end path of the endpoint. In this example, the API URL http://apiserver.com/cars represents a base API endpoint, wherein a variation of the base API endpoint can be obtained by, e.g., the addition of an API parameter (e.g., header parameter, query string parameter, etc.).

For example, the string ?limit=3&format=json is an element that varies the base API endpoint http://apiserver.com/cars, wherein the string contains query parameters for the base endpoint. In this example, the base endpoint accesses a "cars" information resource, and the default GET method would provide a response which limits the returned results to three cars, and the response would be returned in JSON format. As a further example, a URL may include multiple endpoints that refer to the same resource, e.g., http://apiserver.com/cars/{car id}. This URL includes an endpoint that accesses a car resource which has a given identifier {car id}. Tis example illustrates a variation of the base API endpoint with an added path parameter {car id}.

FIG. 2 further illustrates a set of counters 230 that can be associated with the API request 200. The counters 230 comprises an API endpoint counter 231, a method counter 232, a header parameter counter 233, a path parameter counter 234, and a query parameter counter 235. The API endpoint counter 231 is a high-level counter, referred to as base endpoint counter, that is configured to count a number of times that a given base API endpoint (or API URL) is accessed. By way of example, the following API request http://apiserver.com/cars includes an API endpoint which returns a list of all cars within the collection of cars, with GET as a default method. In this instance, each time an API request http://apiserver.com/cars is issued for the given API endpoint, the associated API endpoint counter 231 will be incremented by one.

On the other hand, the counters 232, 233, 234 and 235 are configured to count variations of the API endpoint when API requests for the endpoint are issued with different methods, and parameters. For example, the API request http://apiserver.com/cars/{car id} comprises the same API endpoint as http://apiserver.com/cars, but further comprises a path parameter {car id}, which is used to get details regarding a single car in the collection of cars having the specified car ID (e.g., http://apiserver.com/cars/12 returns details regarding a specific car with {car id}=12). In this instance, when the API request http://apiserver.com/cars/12 is issued for the given API endpoint, the associated API endpoint counter 231 will be incremented by one, and the path parameter counter 234 will be incremented by one.

As another example, the API request http://apiserver.com/companies/employees includes a base API endpoint which returns a list of all employees of all companies, with GET as a default method. Each time an API request http://apiserver.

com/companies/employees is issued for the given API endpoint, the associated base API endpoint counter 231 will be incremented by one. The API request http://apiserver.com/companies/{company id}/employees includes a path parameter {company id}, which is used to get a list of all employees for a single company with the specified company ID. When the API request http://apiserver.com/companies/{company id}/employees is issued for the given API endpoint /companies/employees, the associated API endpoint counter 231 will be incremented by one, and the path parameter counter 234 will be incremented by one.

Similarly, the API request for a given API endpoint can vary with respect to the different types of methods that can be included in the API request for perform different actions with respect to the resource of the API endpoint. For instance, assuming the GET method for a REST API is the default method, the issuance of an API request with the same endpoint, but with a different method, e.g., POST, PUT, DELETE, etc., will result in incrementing the API endpoint counter 231 by one, as well as incrementing the method counter 232 by one. In addition, an API request for the given API endpoint can vary by passing different header parameters in the header block of the API request, e.g., header parameters related to authorization, etc. In this instance, the header parameter counter 233 will be incremented by one when a different header parameter is passed in the API request for the same API endpoint.

Furthermore, the API request for a given API endpoint can vary with respect to different query parameters that are included in the API request. In this regard, an API request for the same API endpoint can be varied to access different resources associated with the same API endpoint. By way of example, assume an API request returns a list of objects (e.g., returns a collection) associated with a given API endpoint, the API request can include one of various types of query strings to perform operations such as searching, filtering, sorting, etc. of the return data. The follow example illustrates variations of an API request which have the same API endpoint /api/companies, but which include a different query string to implement searching, filtering, and sorting of data associated with a "companies" resource:

(1) http://apiserver.com/api/companies
(2) http://apiserver.com/api/companies?sort=name_asc
(3) http://apiserver.com/api/companies?sort=name_desc
(4) http://apiserver.com/api/companies?location=UnitedStates
(5) http://apiserver.com/api/companies?search=Company_A The first API request (1) comprises a high level API request which returns a list of all companies for the given API endpoint /api/companies. The second API request (2) comprises a variation of the high-level API request (1) wherein the query parameter ?sort=name_asc would sort the list of all companies by name in ascending order. The third API request (3) comprises a variation of the high-level API request (1) wherein the query parameter ?sort=name_desc would sort the list of all companies by name in descending order. The fourth API request (4) comprises a variation of the high-level API request (1) wherein the query parameter ?location=UnitedStates would filter the list of companies by location and return only those companies that reside in the United States. The fifth API request (5) comprises a variation of the high-level API request (1) wherein the query parameter ?location=Company_A would search for the company name Company_A in the list of companies and only return information regarding Company_A.

In this example, referring to the exemplary set of counters 230 shown in FIG. 2, the issuance of the high-level API request (1) would result in incrementing the API endpoint counter 231 by one. Further, the issuance of any one of the API requests (2), (3), (4) or (5), which are variations of the high-level API request (1) in terms of different query strings, would result in incrementing the query parameter counter 235 by one, as well as incrementing the high-level API endpoint counter 231 by one. Therefore, the execution of each API request (1)-(5) one time would increase the high-level API counter 231 by 5, and increase the query parameter counter 235 by 4.

It is to be understood that the set of counters 230 shown in FIG. 2 is merely an exemplary embodiment, and that other types of counters can be configured depending on the type of API that is implemented (e.g., REST API, SOAP API, etc.). Furthermore, the granularity and/or hierarchy of the different types of counters that are utilized to track API requests can vary depending on the application. For example, in some embodiments, the method counter 232 can be further expanded to include individual counters for the different methods supported by the given API framework. In particular, for a REST API, the method counter 232 can be expanded to include 4 different method counters, one associated with each supported method GET, PUT, POST and DELETE, wherein each individual method counter is individually incremented when a given API request utilizes the associated methods.

Similarly, one or more of the counters 233, 234, and 235 can be expanded to include counters for supported parameters and associated parameter values. For example, with the illustrative embodiment of the API endpoint /api/companies as discussed above, the query parameter counter 235 can be expanded to include a plurality of different query parameter counters to support the different types of queries that are supported for the given API. In particular, in the above example, there can be different counters to count instances of variations of the API request with regard to the different searching, filtering, and sorting queries that are supported for the API endpoint /api/companies.

Figure 3:
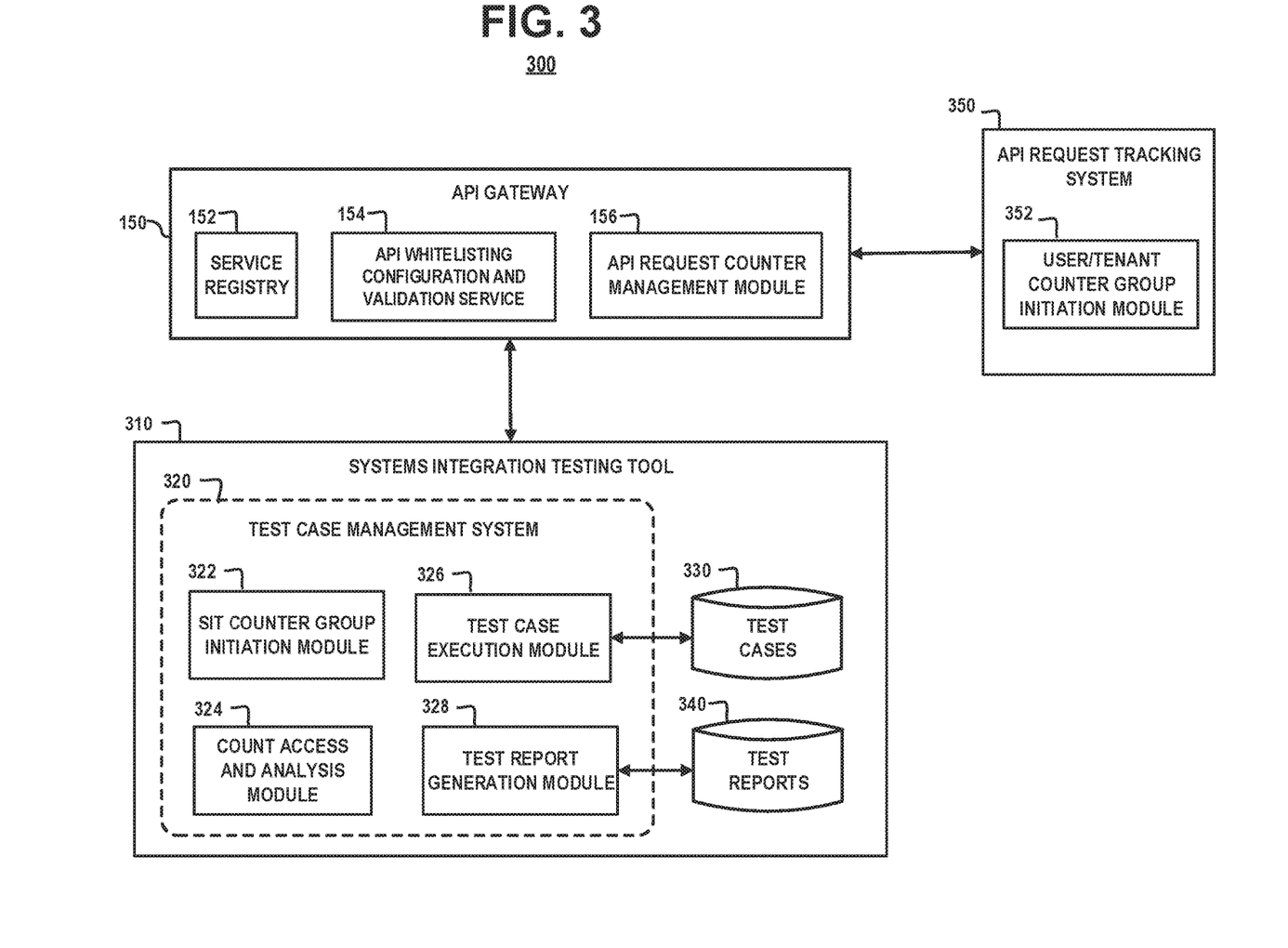
FIG. 3 schematically illustrates a system for tracking API requests in a cloud computing system, according to an exemplary embodiment of the disclosure.

FIG. 3 schematically illustrates a system 300 for tracking API requests in a cloud computing system, according to an exemplary embodiment of the disclosure. In particular, FIG. 3 illustrates different applications or usage scenarios for utilizing counters to track API requests in a cloud computing system, wherein such applications include supporting SIT automation testing, monitoring end-user and customer API access patterns over time, detecting various APIs that are utilized by a given feature of the cloud computing system 130, etc. For purposes of illustration, the system 300 of FIG. 3 will be discussed in the context of the cloud computing platform 130 of FIG. 1 in which a listing (e.g., whitelist) of all known and exposed API endpoints of the microservices 162 of the application platform 160 is generated and maintained by the API gateway 150.

In the exemplary embodiment of FIG. 3, the API request counter and management module 156 is configured to instantiate and manage a set of counters that are associated with each valid API endpoint that is identified by the API whitelisting configuration and validation service 154. Indeed, as noted above, the API whitelist provides information regarding valid API endpoints, including, but not limited to, (i) allowed URL paths and associated parameters, (ii) allowed HTTP methods, (iii) allowed query parameters and parameter values, (iv) allowed HTTP headers and associated parameters, and (v) other types of allowed API URL parameters and associated parameter values. In this regard, the API request counter management module 156 can initialize and manage a set of counters for each valid API endpoint, and then increment the counters accordingly in response to valid API requests that are issued during, e.g., SIT automation testing, etc.

In the context of SIT automation testing, FIG. 3 schematically illustrates a system integration testing tool 310 (referred to as SIT tool 310) which is implemented in conjunction with a continuous development and integration software environment of the cloud computing system 130 to perform automation testing on various features within the feature space of the cloud computing system 130, as the features are newly developed, added, updated, fixed, etc., on a continual basis by various scum teams assigned to work on different features of the cloud computing system 130. The feature space of the cloud computing system 130 comprises, for example, the microservices 162 of the application platform 160, and other features such as microservices, plugins, core services, etc., which are utilized to implement various components and modules of the login portal 140, the API gateway 150, the application platform 160, and the data storage system 170, etc.

For example, plugins comprise software components that may be developed via an integrated development environment (IDE) tool to provide additional/extended functionalities for, e.g., user interface browsers, core services, and other system components to execute functions. The core services comprise "third-party" features that are utilized by the computing system 130, but not necessarily developed/updated in the continuous integration environment of the computing system 130. For example, the core services represent software systems such as database management systems (e.g., relational database management system (RDBMS) implemented using Structured Query Language (SQL)), search engines (e.g., Elasticsearch), statistical computing/data analytics (e.g., R Analytics), etc., and other types of core services that may be utilized in the given computing system environment.

As shown in FIG. 3, the SIT tool 310 comprises a test case management system 320, a database of test cases 330, and a database of test reports 340. The test case management system 320 comprises a SIT counter group initiation module 322, a count access and analysis module 324, a test case execution module 326, and a test report generation module 328. The database of test cases 330 comprises various test cases that cover all aspects of the computing system 130 including, but not limited to, user interface functionality (e.g., graphical user interface (GUI)), API functionality, security, microservices, and various other features. The test cases are configured to ensure that the various features are working as expected and that all dependencies between system modules are functioning properly and that data integrity is preserved between distinct modules of the entire computing system 130.

More specifically, the database of test cases 330 comprises various types of test cases that are designed to test specific functions, components, and microservices within the feature space of the cloud computing system 130 and to test common (or universal) functions that are implemented by many features within the feature space of the cloud computing system 130. Each test case defines a set of one or more actions that are executed to verify the functionality of a particular feature or the functionalities of a set of features that collectively operate to perform a given function. The database of test cases 330 can include test cases that are specifically written by different scrum teams to specifically test the features assigned to the scrum teams. In addition, the database of test cases 330 can include a collection of pre-defined test cases that are used to test common functionalities that are implemented by many features within the feature space of the cloud computing platform 130. Each test case can include various elements including, e.g., (i) an identifier of a feature which is associated with the test case; (ii) test data (e.g., variables and values); (iii) a test procedure to be performed; (iv) a mapping of features within the feature space, which are utilized by the test case to execute a test procedure; (v) an expected result, and (vi) pass/fail criteria, etc.

By way of example, the following test cases can be specified to test a functionality a "login feature" of the login portal 140 in the cloud computing system 130. A first test case can be defined to check the result/response that is obtained when a valid User ID and password are entered into associated fields of a login screen. A second test case can be specified to check the result/response that is obtained when an invalid user ID and/or invalid password is entered in the associated fields of the login screen. A third test case can be defined which checks a response that is obtained when one of the User ID and/or password fields are empty, and a login button is pressed. In this example, the test cases may rely on another system feature (e.g., authentication microservice) which is called by the "login" feature to authenticate a given user based on the entered credentials.

The test case execution module 326 is configured to obtain target test cases from the test case database 330 and execute target test cases to perform a given SIT automation run. The test report generation module 328 generates a test report for each SIT run. The test reports generated by the test report generation module 328 are stored in the database of test reports 340 for subsequent access and analysis. During a SIT run, the test case execution module 326 will generate various API requests as part of the test procedure(s). In some embodiments, the API requests that are generated as part of the SIT run will first be validated against the API whitelist before execution. In this regard, during the SIT run, each API request that is generated by the test case execution module 326 will be processed by the API whitelisting configuration and validation service 154 to confirm that the given API request is valid and permitted.

The SIT counter group initiation module 322 is configured to communicate with the API request counter management module 156 to initiate "counter group" for a given SIT run. In this instance, the "counter group" is configured to map a set of counters to the given SIT automation run and utilize the set of counters that are mapped to the counter group to track API requests that are associated with the given SIT run. This allows multiple SIT tests to be performed concurrently, while API access counts associated with the API requests for the different SIT runs are maintained in separate counter groups.

During a given SIT run, when an API request is issued by the test case execution module 326, and the API request is validated by the API whitelisting configuration and validation service 154, the API request counter and management module 156 will update one or more counters within the counter group that is associated with, and separately maintained for, the given SIT run. At a completion of the given SIT run, the API counters within the associated counter group for the given SIT run will contain API count information regarding the number of times a given API endpoint and associated variations of the API endpoint were accessed during the SIT run.

The count access and analysis module 324 is configured to communicate with the API request counter management module 156 to obtain counter values of the counters for the API requests that are issued for a given SIT run. The obtained counter values are analyzed and processed by the count access and analysis module 324 to generate API count information data (e.g., JSON object) which can be sent to the test report generation module 328 for inclusion within the test report that is generated for the given SIT run.

The API counters within a given counter group provide a mechanism to track the APIs and variations of the APIs that are issued during the given SIT run. This allows the SIT tool 310 to determine or otherwise identify (i) any API endpoints that were not accessed during the SIT run, which were expected to be accessed, (ii) any API parameters or values that were not included in the API requests issued during the SIT run, which were expected to be included and utilized in the SIT run, and (iii) all API endpoints and variations of API endpoints in terms of different API parameters and values that were issued and utilized during the SIT run.

In some embodiments, the count access and analysis module 324 is configured to compare the actual count values of the API requests that were issued for given SIT run against predetermined count values for API requests that were expected to be issued for the given SIT run. The SIT tool 310 can be configured to pass for fail the given SIT run based, at least in part on, a difference between the actual and expected count values for the given SIT run. For instance, when SIT testing the functionality of a given microservice or feature, there can be specified test requirements that are expected to be met to ensure that the APIs are exhibiting proper behaviors. For example, there can be a requirement that all valid API parameters and values for query strings for a given API endpoint must be tested to ensure proper behavior. In this instance, if the final count values for the given API endpoint (and its variations) provide an indication that not all variations of the API endpoint have been tested during a given SIT run, the SIT tool 310 can fail the given SIT run.

As further shown in FIG. 3, in the context of monitoring end-user and customer API access patterns, the system 300 implements an API request tracking system 350. The API request tracking system 350 is configured to track API requests that are issued by different end-users, customers, tenants, etc., to access services of the cloud computing system 130. In a multi-tenant environment, the user/tenant counter group initiation module 352 is configured to communicate with the API request counter management module 156 to initiate the formation of a "counter group" that is associated with a given customer, tenant, business, etc., that accesses the services of the cloud computing system 130. In this instance, the "counter group" is configured to map a set of counters to the given customer, tenant, etc., and utilize the set of counters within the counter group to track API requests that issued by the given customer, tenant, etc., over time.

When a given customer issues an API request to the API gateway 150, the API request will be validated against the API whitelist, and then one or more associated API counters within the counter group of the given customer will be incremented. The API counter values within the counter groups of the customers, tenants, etc. are maintained over time (e.g., days, months, etc.) and then analyzed by the API request tracking system 350 to identify usage patterns of services of the cloud computing system 130. For example, if the API counter values of one or more customers indicate that a given API endpoint, or variation thereof, is not utilized at all, or otherwise minimally utilized over a period of time, the developers of the cloud computing system can eliminate the feature or features associated given API endpoint, so as to not waste time in resources in supporting a feature or features which are not utilized by customers. On the other hand, if the API counter values of one or more customers indicate high usage of a given API endpoint, or variation thereof, this would provide justification for the developers to focus their time and effort and expense in supporting, optimizing, or otherwise updating the feature or features associated with the commonly accessed API endpoint.

In another application, the API counters can be utilized to detect the APIs that a given feature utilizes to perform certain functions. For example, a process of modifying a data table can be relatively complex such that an API request to modify the data table may require the invocation of multiple API requests to multiple microservices or features. As features of the cloud computing system are developed, modified, deleted, the use of API counters to track API requests provides information that allows a developer to understand an impact to the cloud computing system when features are changed, updated, etc. By running specific SIT tests for specific features, a developer can quickly identify what APIs, parameters, and microservices that the feature utilizes without having to digging through the program code that is associated with the feature.

For instance, using the SIT tool 310, a developer can access a UI of the cloud computing system and interact with the system as a normal user. During such interaction, the API request counter and management module 156 can be configured update API counters that are instantiated to track the API requests that are issued during the given interaction. The developer can utilize the resulting API counter values to identify the different APIs that are accessed as a result of such interaction, and thereby determine the impact to other system components, features, etc., when interacting with a given feature.

Figure 4:
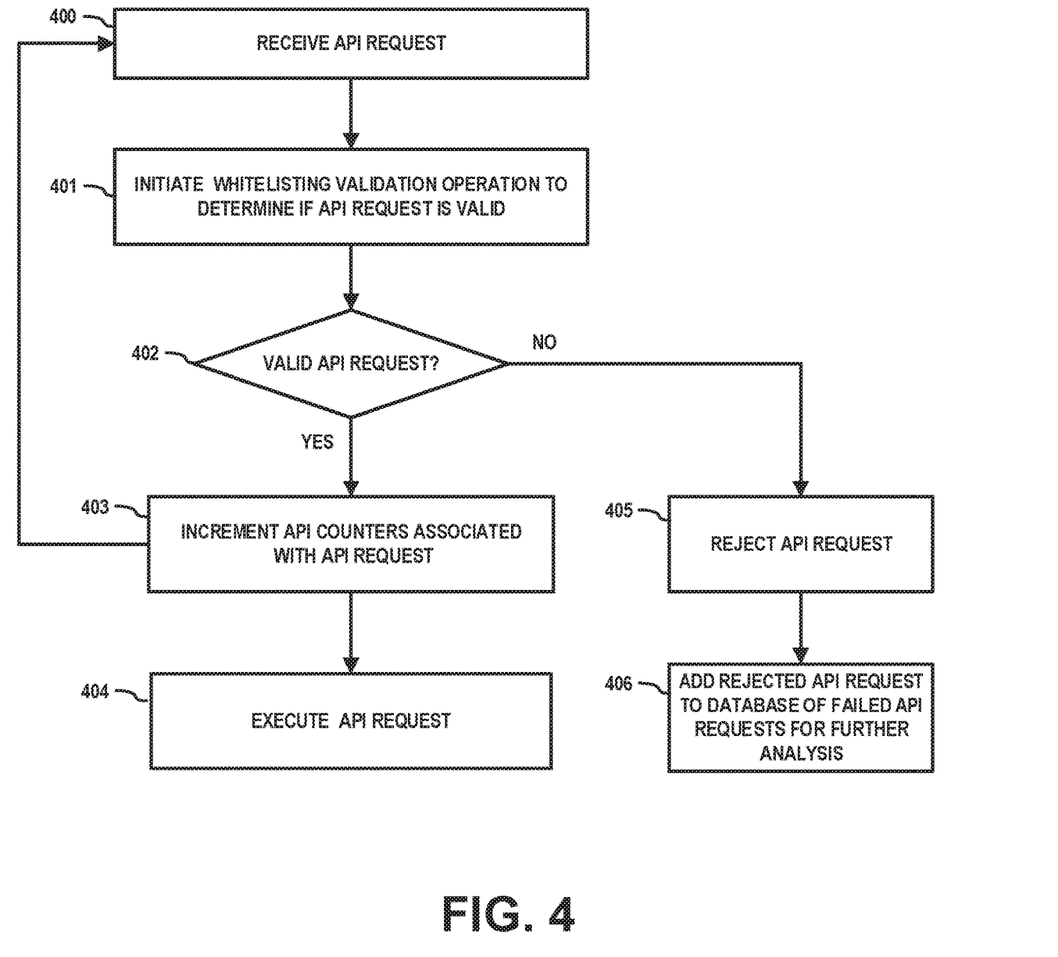
FIG. 4 is a flow diagram of method for tracking API requests in a cloud computing system, according to an exemplary embodiment of the disclosure.

FIG. 4 is a flow diagram of method for tracking API requests in a cloud computing system, according to an exemplary embodiment of the disclosure. For illustrative purposes, the method of FIG. 4 will be discussed in the context of the system 300 of FIG. 3. Referring to FIG. 4, the API gateway 150 receives an API request (block 400). The API request can a request that is issued by the SIT tool 310 during a SIT run, or a request that is used by a customer/tenant to the API gateway 150 for accessing a service. In response to receiving the API request, the API gateway 150 initiates a whitelisting validation operation to determine if the API request is valid (e.g., a valid API endpoint) (block 401). In particular, the API gateway 150 will pass the received API request to the API whitelisting configuration and validation service 154 to perform the whitelisting validation operation on the received API request.

The whitelisting validation operation comprises comparing the API request to a whitelist of known and permitted API requests associated with exposed API endpoints of registered services. In particular, the whitelisting validation operation comprises comparing an API endpoint of the client API request to a whitelist of permitted API endpoints of registered microservices of the application to determine whether the API endpoint of the API request comprises a permitted API endpoint in the whitelist. In some embodiments, the whitelisting validation operation comprises parsing the API request into constituent elements (e.g., paths, methods, parameters) and analyzing the elements separately and/or in combination, against an API whitelist to determine whether or not such elements are valid. For example, the whitelisting validation operation can begin by comparing the URL path(s) (e.g., endpoint paths) of the given API request against permitted URL path(s) in the API whitelist to determine if the URL paths of the API request are allowed.

If the URL paths of the given API request are deemed valid, then the whitelisting operations can proceed to compare other elements of the given API request to elements of permitted API request in the API whitelist to determine if the client API request is valid. For example, the whitelisting validation operation can proceed to determine if the API request comprises allowed methods, allowed URL parameters, allowed URL parameter values, and/or allowed headers, etc. There can be an instance where the endpoint paths for accessing a target resource are valid, while the specified methods for interacting with the target resource are not valid. In addition, there can be an instance where the specified endpoint paths and methods of the API request are deemed valid, while the URL parameters of the API request include one or more unsupported parameters. The parameters of the API request can be compared to known valid parameters included in the whitelist or valid parameter expressions using regex (regular expressions) methods for analyzing the API request for invalid patterns, etc. Further, the HTTP headers of the API request can be compared against permitted headers to determine if the API request contains unsupported headers.

If the API request is deemed to be a permitted API request, e.g., the API request includes elements that are included in current API whitelist (affirmative determination in block 402), the API gateway 150 will increment one or more API counters that are associated with the API request, and the API request will be executed (block 404). On the other hand, if the API request is deemed not to be a permitted API request (negative determination in block 402), the API request will be rejected (block 406) and an error message (e.g., HTTP status code) may be sent from the API gateway 150. The API request will be rejected in response to the whitelist validation operation determining that an identified endpoint path of the client API request is not a permitted API endpoint path, or that an identified endpoint parameter of the API request is not a permitted API endpoint parameter, or that an identified endpoint parameter value of the API request is not a permitted API endpoint parameter value, or that an identified method of the API request is not a permitted method, or that an identified header of the API request is not a permitted header, etc. Moreover, in some embodiments, the rejected API request will be added to a database of failed API requests for further analysis (block 407). In this regard, in addition to tracking valid API requests using the API counters, the system can track API requests that fail whitelist validation or entitlement validation over time, and analyze the failed API request to identify potential security risks, attack vector patterns, etc.

Figure 5:
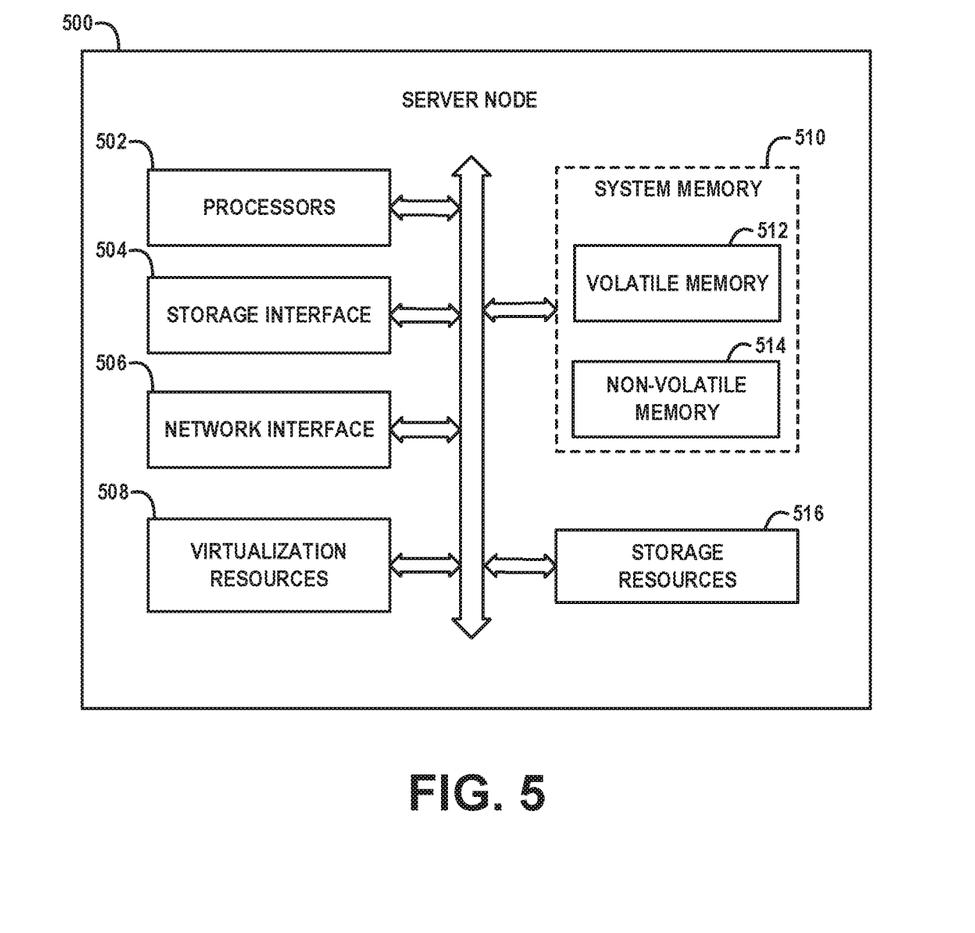
FIG. 5 schematically illustrates framework of a server node which can be implemented for hosting the API request tracking system of FIG. 3, according to an exemplary embodiment of the disclosure.

It is to be understood that the various software modules of the API tracking system 300 of FIG. 3 can be implemented on one or more server nodes. For example, FIG. 5 schematically illustrates framework of a server node 500 which can be implemented for hosting the API tracking system 300 of FIG. 3, according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514.

The processors 502 comprise one or more types of hardware processors that are configured to process program instructions and data to execute a native operating system (OS) and applications that run on the server node 500. For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the server node 500. For example, the virtualization resources 508 can be configured to implement the various modules and functionalities of the system 300 of FIG. 3 as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well the various modules and functionalities of the system 300 of FIG. 3 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the API tracking system 300 comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of a NAND Flash storage device, a SSD device, or other types of next generation non-volatile memory (NGNVM) devices. The system memory 510 can be implemented using a hierarchical memory tier structure wherein the volatile system memory 512 is configured as the highest-level memory tier, and the non-volatile system memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   receiving, by an application programming interface (API) gateway, an API request which specifies a given API endpoint to access a target service of a computing system;
   determining, by the API gateway, whether the received API request is a valid API request for accessing the target service by at least determining whether the given API endpoint is a permitted API endpoint associated with the target service; and
   responsive to determining that the received API request is valid;
       accessing, by the API gateway, at least one API counter associated with the given API endpoint of the received API request, wherein the at least one API counter is configured to count a number of times that the given API endpoint is accessed;
       incrementing a count of the at least one API counter by one; and
       routing, by the API gateway, the API request to the target service for execution.

2. The method of claim 1, wherein accessing the at least one API counter comprises accessing, by the API gateway, a set of API counters associated with the given API endpoint, wherein the set of API counters comprises a first counter that is configured to count the number times that a base API endpoint of the given API endpoint is accessed, and at least a second counter that is configured to count a number of times that a variation of the base API endpoint is accessed.

3. The method of claim 2, wherein the variation of the base API endpoint comprises the base API endpoint with an added header parameter, wherein the second counter is configured to count a number of times that the base API endpoint with the added header parameter is accessed.

4. The method of claim 2, wherein the variation of the base API endpoint comprises the base API endpoint with a non-default method, wherein the second counter is configured to count a number of times that the base API endpoint with the non-default method is accessed.

5. The method of claim 2, wherein the variation of the base API endpoint comprises the base API endpoint with an added query parameter, wherein the second counter is configured to count a number of times that the base API endpoint with the added query parameter is accessed.

6. The method of claim 2, wherein the variation of the base API endpoint comprises the base API endpoint with an added path parameter, wherein the second counter is configured to count a number of times that the base API endpoint with the added path parameter is accessed.

7. The method of claim 1, wherein determining, by the API gateway, whether the received API request is a valid API request for accessing the target service by at least determining whether the given API endpoint is a permitted API endpoint associated with the target service, comprises comparing the given API endpoint specified in the received API request to a whitelist of permitted API endpoints associated with registered microservices of the computing system.

8. The method of claim 1, wherein accessing, by the API gateway, at least one API counter associated with the given API endpoint of the received API request comprises:
    determining, by the API gateway, a counter group associated with an entity that issued the API request; and
    accessing, by the API gateway, the at least one API counter associated with the given API endpoint of the received API request, which is included in the determined counter group.

9. The method of claim 8, wherein the counter group is associated with an automation test performed by a system integration testing tool.

10. The method of claim 8, wherein the counter group is associated with a registered end-user of the computing system.

11. An article of manufacture comprising a non-transitory processor-readable storage medium having stored therein program code of one or more software programs, wherein the program code is executable by one or more processors to implement a method comprising:
    receiving, by an application programming interface (API) gateway, an API request which specifies a given API endpoint to access a target service of a computing system;
    determining, by the API gateway, whether the received API request is a valid API request for accessing the target service by at least determining whether the given API endpoint is a permitted API endpoint associated with the target service; and
    responsive to determining that the received API request is valid;
        accessing, by the API gateway, at least one API counter associated with the given API endpoint of the received API request, wherein the at least one API counter is configured to count a number of times that the given API endpoint is accessed;
        incrementing a count of the at least one API counter by one; and
        routing, by the API gateway, the API request to the target service for execution.

12. The article of manufacture of claim 11, wherein accessing the at least one API counter comprises accessing, by the API gateway, a set of API counters associated with the given API endpoint, wherein the set of API counters comprises a first counter that is configured to count the number times that a base API endpoint of the given API endpoint is accessed, and at least a second counter that is configured to count a number of times that a variation of the base API endpoint is accessed.

13. The article of manufacture of claim 12, wherein the variation of the base API endpoint comprises the base API endpoint with an added header parameter, wherein the second counter is configured to count a number of times that the base API endpoint with the added header parameter is accessed.

14. The article of manufacture of claim 12, wherein the variation of the base API endpoint comprises the base API endpoint with a non-default method, wherein the second counter is configured to count a number of times that the base API endpoint with the non-default method is accessed.

15. The article of manufacture of claim 12, wherein the variation of the base API endpoint comprises the base API endpoint with an added query parameter, wherein the second counter is configured to count a number of times that the base API endpoint with the added query parameter is accessed.

16. The article of manufacture of claim 12, wherein the variation of the base API endpoint comprises the base API endpoint with an added path parameter, wherein the second counter is configured to count a number of times that the base API endpoint with the added path parameter is accessed.

17. The article of manufacture of claim 11, wherein accessing, by the API gateway, at least one API counter associated with the given API endpoint of the received API request comprises:
    determining, by the API gateway, a counter group associated with an entity that issued the API request; and
    accessing, by the API gateway, the at least one API counter associated with the given API endpoint of the received API request, which is included in the determined counter group;
    wherein the counter group is associated with one of (i) an automation test performed by a system integration testing tool and (ii) a registered end-user of the computing system.

18. A server node, comprising:
    at least one processor; and
    system memory configured to store program code, wherein the program code is executable by the at least one processor to instantiate an application programming interface (API) gateway, wherein the API gateway is configured to:
        receive an API request which specifies a given API endpoint to access a target service of a computing system;
        determine whether the received API request is a valid API request for accessing the target service by at least determining whether the given API endpoint is a permitted API endpoint associated with the target service, and in response to determining that the received API request is valid;
            access at least one API counter associated with the given API endpoint of the received API request, wherein the at least one API counter is configured to count a number of times that the given API endpoint is accessed;
            increment a count of the at least one API counter by one; and
            route the API request to the target service for execution.

19. The server node of claim 18, wherein in accessing the at least one API counter, the API gateway is configured to access a set of API counters associated with the given API endpoint, wherein the set of API counters comprises a first counter that is configured to count the number times that a base API endpoint of the given API endpoint is accessed, and at least a second counter that is configured to count a number of times that a variation of the base API endpoint is accessed.

20. The server node of claim 18, wherein in accessing the at least one API counter, the API gateway is configured to:
- determine a counter group associated with an entity that issued the API request; and
- access the at least one API counter associated with the given API endpoint of the received API request, which is included in the determined counter group;
- wherein the counter group is associated with at least one of (i) an automation test performed by a system integration testing tool and (ii) a registered end-user of the computing system.

* * * * *